(12) United States Patent
Mermoud et al.

(10) Patent No.: US 12,418,456 B2
(45) Date of Patent: *Sep. 16, 2025

(54) END USER RECOMMENDATION SERVICE TO ENSURE SATISFACTORY APPLICATION QOE

(71) Applicant: Cisco Technology, Inc., San Jose, CA (US)

(72) Inventors: Grégory Mermoud, Venthône (CH); Jean-Philippe Vasseur, Combloux (FR); Grégoire Magendie, Lamorlaye (FR); Romain Kakko-Chiloff, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/660,598

(22) Filed: May 10, 2024

(65) Prior Publication Data

US 2024/0291715 A1 Aug. 29, 2024

Related U.S. Application Data

(63) Continuation of application No. 18/107,596, filed on Feb. 9, 2023, now Pat. No. 12,021,691.

(51) Int. Cl.
*H04L 12/00* (2006.01)
*G06N 5/022* (2023.01)
*H04L 41/08* (2022.01)
*H04L 67/306* (2022.01)

(52) U.S. Cl.
CPC ......... *H04L 41/0883* (2013.01); *G06N 5/022* (2013.01); *H04L 67/306* (2013.01)

(58) Field of Classification Search
CPC ... G06N 5/022; H04L 41/0883; H04L 67/306; H04L 41/5067; H04L 67/535
USPC .............................................. 709/223; 706/46
See application file for complete search history.

(56) References Cited

U.S. PATENT DOCUMENTS

| | | | |
|---|---|---|---|
| 9,443,199 B2* | 9/2016 | Pinckney | G06Q 30/02 |
| 10,708,149 B2 | 7/2020 | Wu et al. | |
| 10,862,771 B2 | 12/2020 | Tomkins et al. | |
| 10,868,888 B1 | 12/2020 | Govan et al. | |
| 10,872,160 B2* | 12/2020 | AthuluruTIrumala | G06Q 10/0633 |
| 11,222,273 B2* | 1/2022 | Liu | G06N 5/04 |
| 11,310,373 B1 | 4/2022 | Gallegos et al. | |
| 11,316,752 B2 | 4/2022 | Côté et al. | |
| 11,438,781 B2 | 9/2022 | Lau et al. | |
| 11,651,412 B2* | 5/2023 | Wilson | H04L 67/52 706/46 |
| 11,899,760 B2* | 2/2024 | Groth | G06F 21/577 |
| 12,021,691 B1* | 6/2024 | Mermoud | H04L 67/306 |

(Continued)

*Primary Examiner* — Frantz Coby
(74) *Attorney, Agent, or Firm* — Lee & Hayes, P.C.; James M. Behmke

(57) ABSTRACT

In one embodiment, a recommendation service of a device provides a recommended action to a client of an online application predicted to improve a quality of experience metric for the online application. The device receives feedback from the client indicative of the recommended action not being implemented by a user of the client. The device determines, based on the feedback, a reason for the recommended action not being implemented. The device updates the recommendation service based on the reason for the recommended action not being implemented.

20 Claims, 9 Drawing Sheets

(56) References Cited

U.S. PATENT DOCUMENTS

| | | | |
|---|---|---|---|
| 12,093,795 B2* | 9/2024 | Scavo | G06Q 30/0282 |
| 2015/0178637 A1 | 6/2015 | Bogojeska et al. | |
| 2016/0345191 A1 | 11/2016 | Wynn et al. | |
| 2017/0024765 A1 | 1/2017 | Barenholz et al. | |
| 2017/0186019 A1 | 6/2017 | Loeb et al. | |
| 2017/0353582 A1 | 12/2017 | Zavesky et al. | |
| 2019/0163758 A1 | 5/2019 | Zhivotvorev et al. | |
| 2020/0210932 A1* | 7/2020 | Monovich | G06Q 10/063112 |
| 2020/0310851 A1 | 10/2020 | Featonby et al. | |
| 2020/0310852 A1 | 10/2020 | Featonby et al. | |
| 2021/0144233 A1 | 5/2021 | Govan et al. | |
| 2022/0292574 A1* | 9/2022 | Rose | G06Q 30/0631 |

* cited by examiner

END USER RECOMMENDATION SERVICE TO ENSURE SATISFACTORY APPLICATION QOE

RELATED APPLICATION

This application is a continuation of U.S. patent application Ser. No. 18/107,596, filed on Feb. 9, 2023, both entitled "END USER RECOMMENDATION SERVICE TO ENSURE SATISFACTORY APPLICATION QOE" by Mermoud et al., the contents of which are incorporated by reference herein.

TECHNICAL FIELD

The present disclosure relates generally to computer networks, and, more particularly, to an end user recommendation service to ensure satisfactory application quality of experience (QoE).

BACKGROUND

In recent years, work-from-home and hybrid work options have grown considerably in popularity. For such setups to be effective, though, the application experience for the various online applications accessed by a remote worker needs to be at an acceptable level. Indeed, the productivity of most remote workers is directly a function of the quality of experience provided by the various online applications that they use. For instance, a videoconferencing application that keeps freezing on a remote worker may greatly impact their ability to perform their work duties.

When an application is objectively malfunctioning, support, documentation, and frequently asked questions (FAQs) can be useful resources for an end user of the application. However, when the application is subjectively malfunctioning, meaning that the user believes their experience with the application has been degraded, these resources largely become useless. Distinguishing between the two is also not an easy task, as quantifying the quality of experience (QoE) perceived by the user remains quite challenging. Consequently, the user is often left dissatisfied with their experience with the online application and without any insights as to why, nor any recourse.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
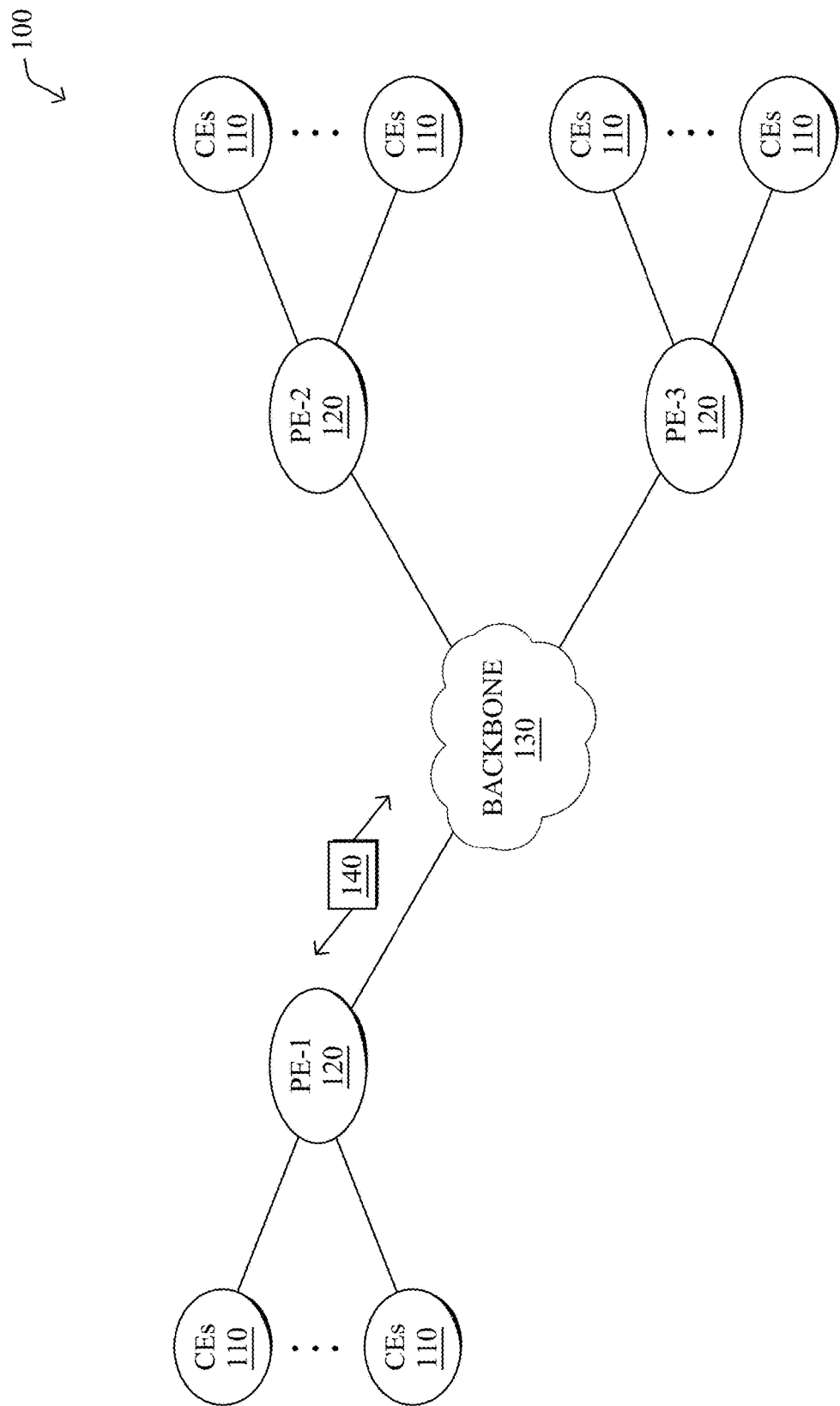
FIGS. 1A-1B illustrate an example communication network.

According to one or more embodiments of the disclosure, a recommendation service of a device provides a recommended action to a client of an online application predicted to improve a quality of experience metric for the online application. The device receives feedback from the client indicative of the recommended action not being implemented by a user of the client. The device determines, based on the feedback, a reason for the recommended action not being implemented. The device updates the recommendation service based on the reason for the recommended action not being implemented.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
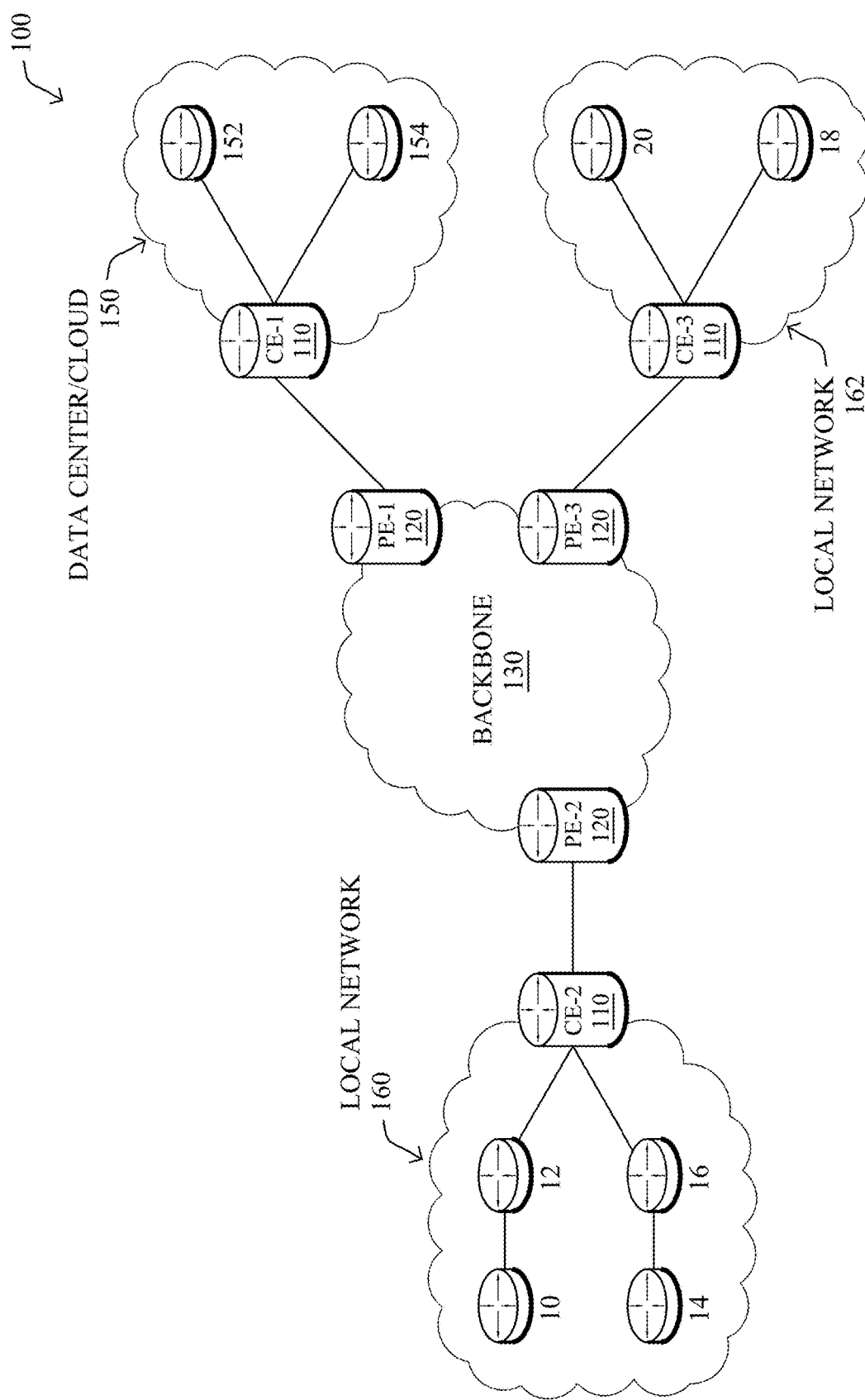

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
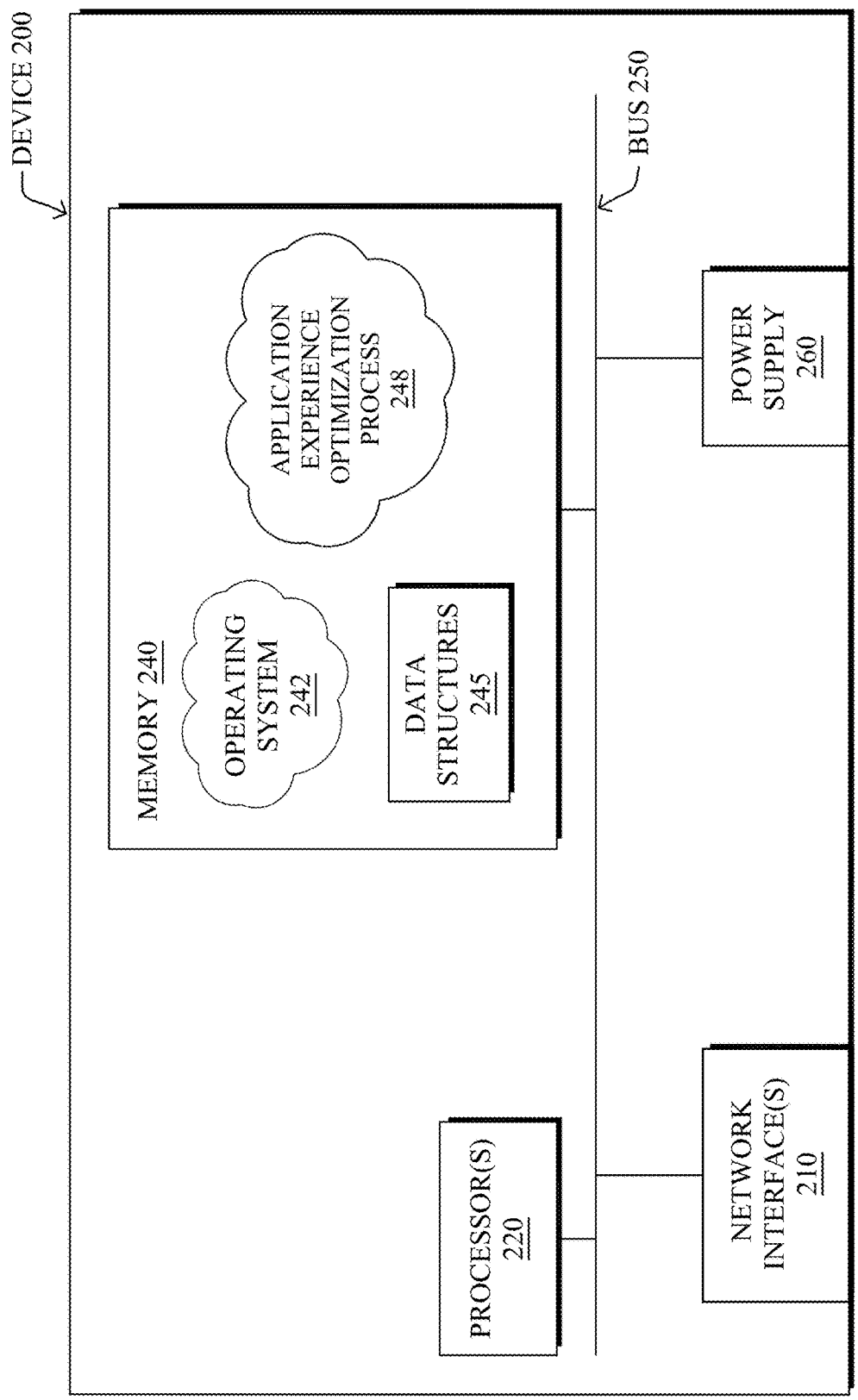
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, application experience optimization process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, application experience optimization process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a_*x+b_*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 and/or data denoising process may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision.

Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
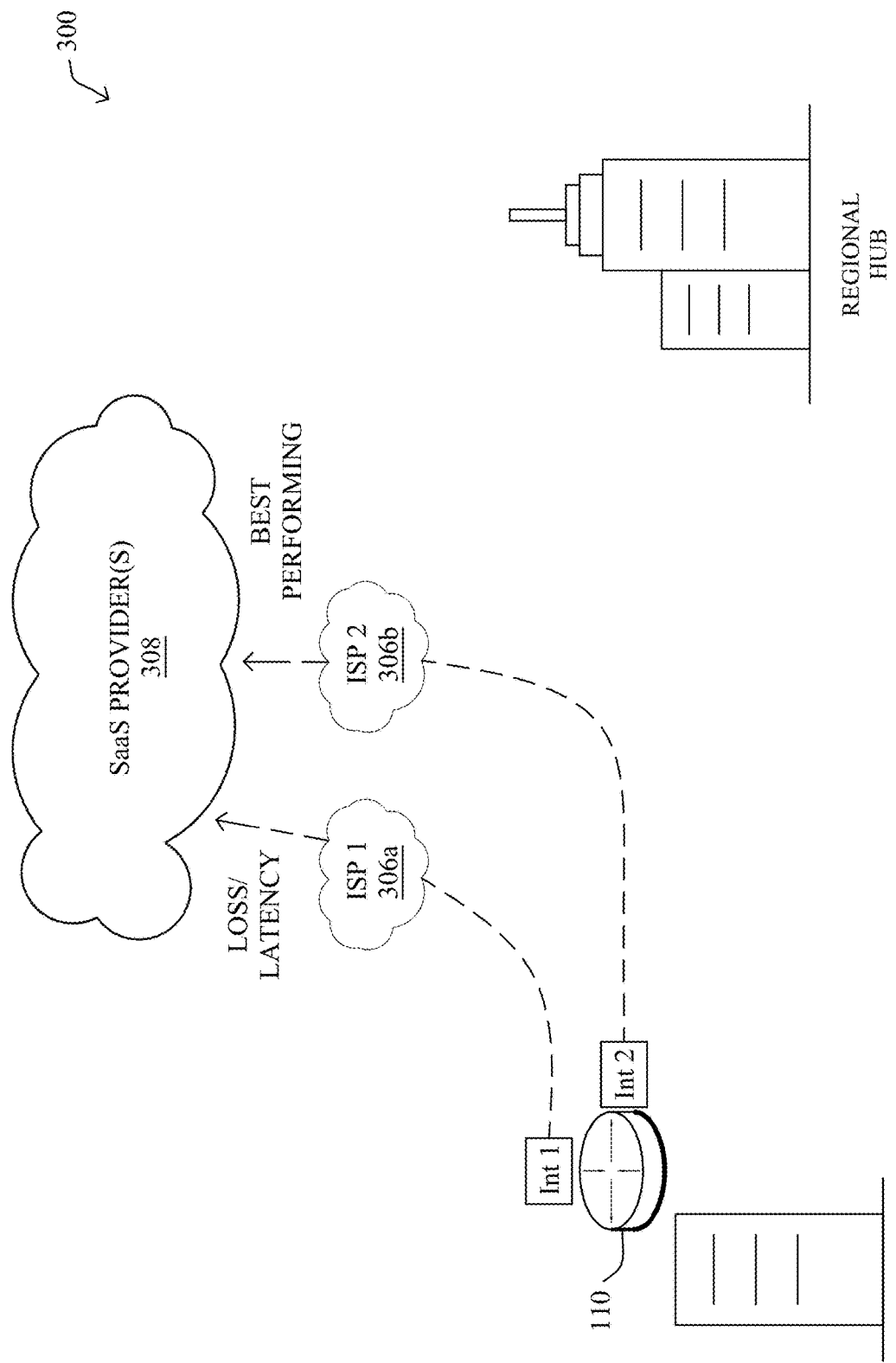
FIGS. 3A-3B illustrate example network deployments.
Figure 3B:
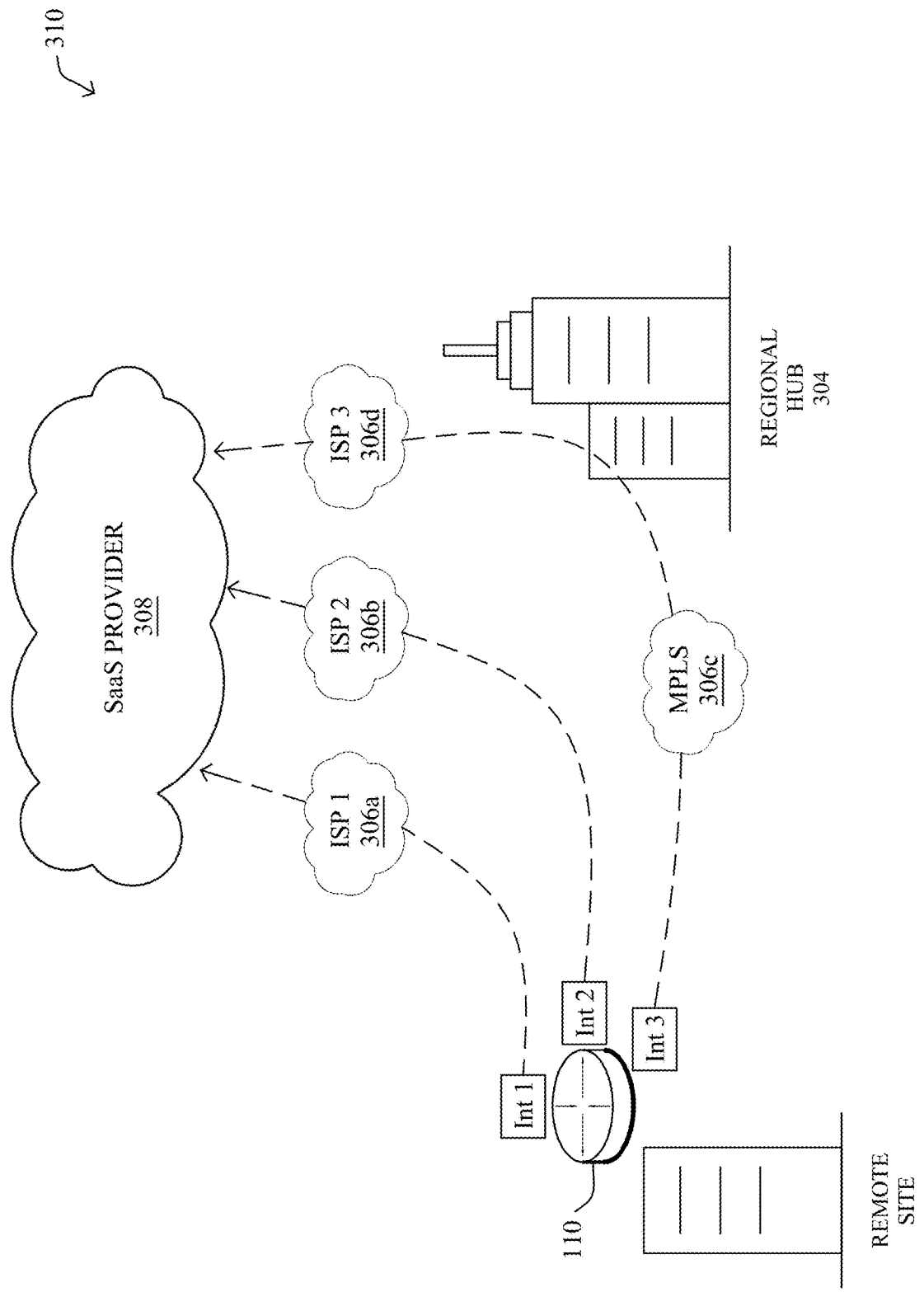

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
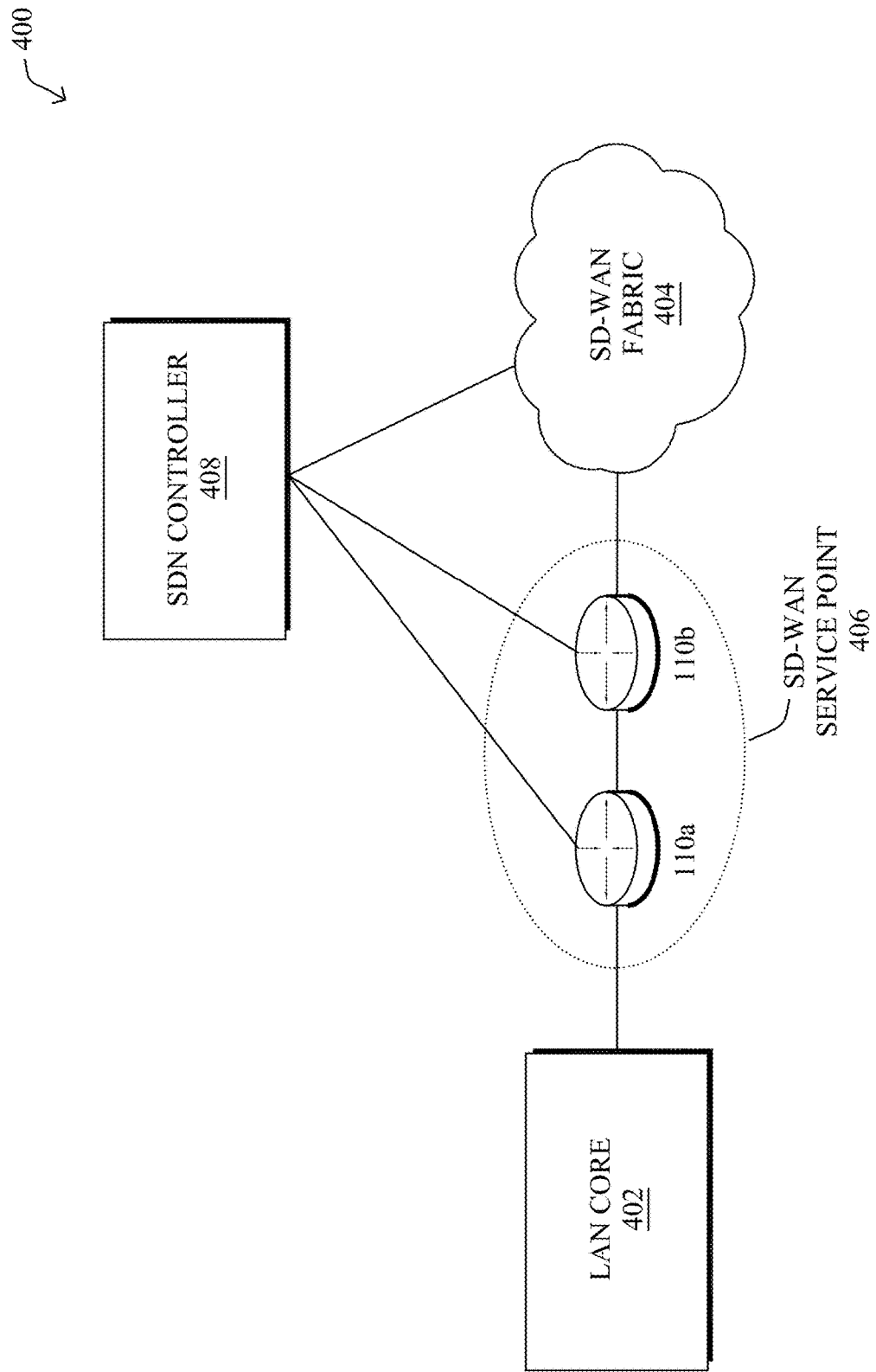
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
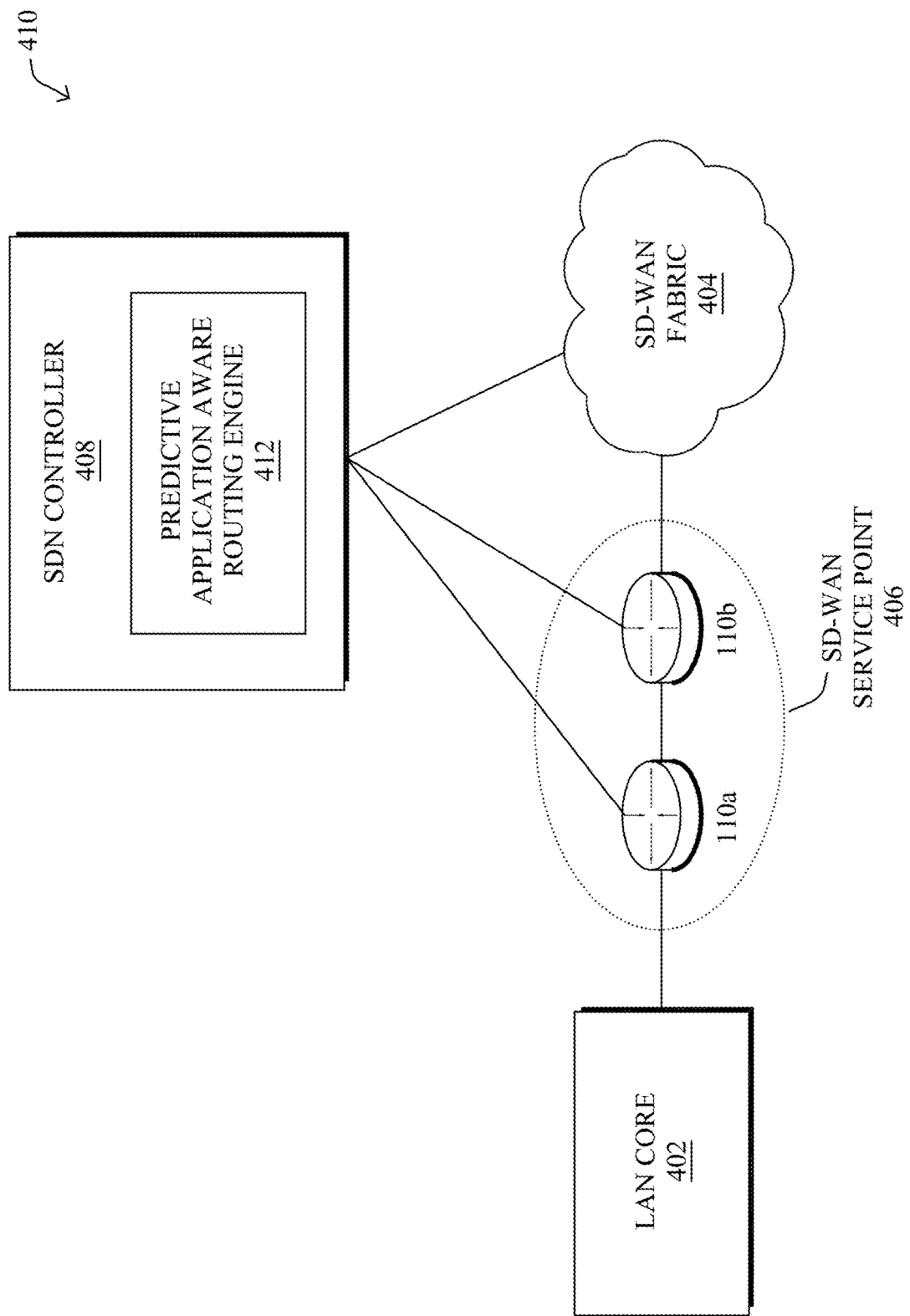

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, optimizing remote work has become a key objective for any IT network. Unfortunately, users are often left alone in the dark when facing a poor QoE with an online/SaaS application. When an application is objectively malfunctioning (e.g., something is verifiably broken), support, documentation, frequently asked questions (FAQs), and the like, are useful resources. However, when the application is subjectively malfunctioning (e.g., the experience is poor), then most of these resources become useless.

End User Recommendation Service to Ensure Satisfactory Application QoE

The techniques introduced herein not only allow for the QoE of online applications to be measured at scale, but also suggest remediation actions to end users, when the predicted QoE is considered degraded. Such actions may only be applied by the end user, and feedback may also be collected from the user, to refine and improve the performance of the recommendation service.

Illustratively, the techniques described herein may be performed by hardware, software, and/or firmware, such as in application experience optimization process 248, which may include computer executable instructions executed by the processor 220 (or independent processor of interfaces 210) to perform functions relating to the techniques described herein.

Specifically, according to various embodiments, a recommendation service of a device provides a recommended action to a client of an online application predicted to improve a quality of experience metric for the online application. The device receives feedback from the client indicative of the recommended action not being implemented by a user of the client. The device determines, based on the feedback, a reason for the recommended action not being implemented. The device updates the recommendation service based on the reason for the recommended action not being implemented.

Figure 5:
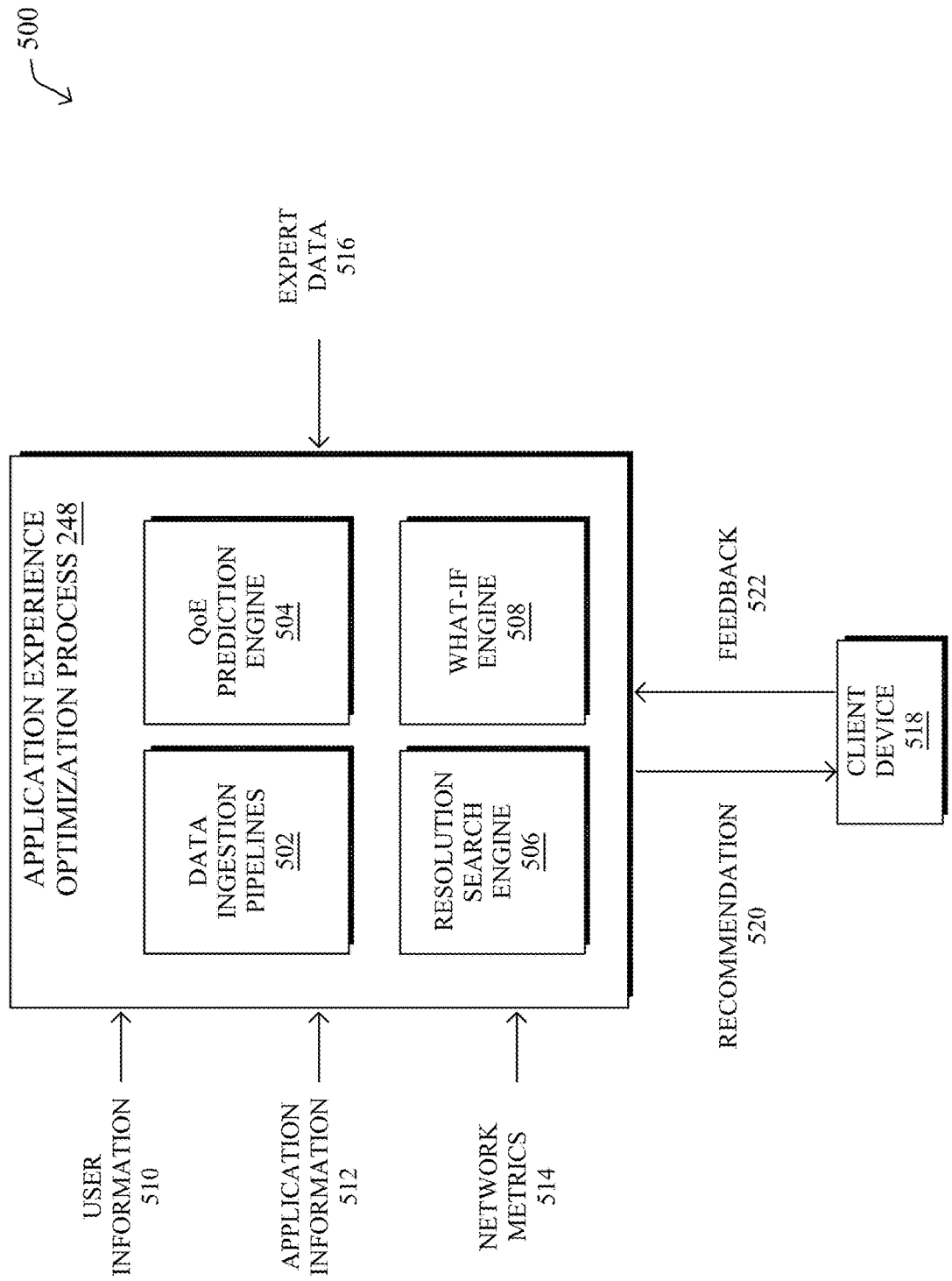
FIG. 5 illustrates an example architecture for an end user recommendation service to ensure satisfactory application quality of experience (QoE)

Operationally, FIG. 5 architecture for an end user recommendation service to ensure satisfactory application quality of experience (QoE), according to various embodiments. At the core of architecture 500 is application experience optimization process 248, which may be executed by a controller for a network, a networking device, or another device in communication therewith. For instance, application experience optimization process 248 may be executed by a controller for a network (e.g., SDN controller 408 in FIGS. 4A-4B), a particular networking device in the network (e.g., a router, etc.), another device or service in communication therewith, or any other device in a network. In some embodiments, for instance, application experience optimization process 248 may be used to implement a predictive application aware routing engine, such as predictive application aware routing engine 412, or another supervisory service for the network. In further embodiments, application experience optimization process 248 may be used to provide a recommendation service to client devices in a network, such as client device 518.

As shown, application experience optimization process 248 may include any or all of the following components: data ingestion pipelines 502, QoE prediction engine 504, resolution search engine 506, and/or a what-if engine 508. As would be appreciated, the functionalities of these components may be combined or omitted, as desired (e.g., implemented as part of application experience optimization process 248). In addition, these components may be implemented on a singular device or in a distributed manner, in which case the combination of executing devices can be viewed as their own singular device for purposes of executing application experience optimization process 248.

During execution, data ingestion pipelines 502 may operate in conjunction with any number of telemetry collection mechanisms, to obtain various information, such as user information 510, application information 512, and/or network metrics 514. As detailed below, such telemetry collection mechanisms may include, but are not limited to, network path probing mechanisms, user account information, QoE collection/surveying mechanisms, the online applications themselves (e.g., via application programming interfaces of the applications), and the like.

In general, user information 510 may include any information about the plurality of users of an online application. For instance, user information 510 may be available from a human resources (HR) service, account information from the online application, network account information, combinations thereof, or the like. In various embodiments, user information 510 may include any or all of the following:

Location information for the user—e.g., the city, zip code, metropolitan area, country, etc.

The type of uplink(s) available to the user—e.g., service providers, network types (e.g., cellular, fiber, etc.), Wi-Fi SSIDs, and the like.

Information regarding the user's client device—e.g., device type, device resources (e.g., CPU and memory usage of applications), software installed, software currently running, the user's permission level (e.g., whether they have administrator privileges), etc. Such information could be gathered, for instance, through the execution of a local agent (e.g., Duo Device Health) or from the operating system of the client device (e.g., iOS, Android, etc.).

Information regarding the local network of the user—e.g., their router, IP tables, etc.

Any other information regarding the user, their client device, and/or the network that they use to access the online application.

Application information 512 may include any telemetry data available from the online application (e.g., Layer 7 information) that could be used to predict the QoE metrics of its users. For instance, application information 512 may include concealment times, mean opinion score (MOS) information, or other such application-level information. In some embodiments, application information 512 may even include ratings provided by the users themselves, such as survey data regarding how satisfied users of the application are with their experiences. In additional embodiments, application information 512 may also include telemetry captured by an application and performance monitoring (APM) solution, such as Datadog, AppDynamics, or the like.

Network metrics 514 may generally include any network-level (e.g., Layer 3) telemetry data that could be used to predict the QoE metrics for users of the online application. For instance, network metrics 514 may include path metrics regarding the various network paths (e.g., DIA paths, tunnels, etc.) used to access the online application. For instance, network metrics 516 may be obtained by sending probes along the various paths/tunnels, such as Bidirectional Forwarding Detection (BFD) or CXP probes, that indicate path metrics such as loss, latency, jitter, throughput, etc. Netflow or IPFIX records represent another potential source of network metrics 514. In addition, network metrics 514 may also include state information for the various networking devices (e.g., queue states, hardware resources, etc.) associated with those network paths. Example sources for network metrics 514 may include, but are not limited to, network controllers (e.g, vManage, Cisco DNA, Meraki, etc.), path probing mechanisms (e.g., ThousandEyes), client-side sensors (e.g., AnyConnect), or the like.

This telemetry is then turned into a set of features from which a proper representation can be learned by QoE prediction engine 504, to produce a prediction model capable of predicting the QoE of the application as a QoE metric. In various embodiments, the prediction model of QoE prediction engine 504 may repeatedly (e.g., continuously) perform predictions of the application QoE for any given user monitored by the system. In turn, when QoE prediction engine 504 detects a degraded QoE (r a sudden drop occurs), QoE prediction engine 504 may notify resolution search engine 506 with any or all of the following details:

Identifier of the user (email, username)

Estimated QoE (either as a score or a confidence interval thereof)

Feature importance scores (e.g., Shapley values)

Feature values

In one embodiment, QoE prediction engine 504 may provide such information for a set of applications determined by the system (or automatically detected using for example a classification engine recognizing the set of applications being used by the user). In another embodiment, an administrator may specify a list of application(s) of high interest (e.g. voice/video, O365, etc.) for which the techniques herein should be enabled.

When resolution search engine 506 is notified by QoE prediction engine 504 of a change in the QoE of an application, it may seek to determine the set of one or more actions that an end user may perform towards a resolution, or at least an improvement, of the QoE disruption. To this end, resolution search engine 506 may rely on any or all of the following:

- Feature importance scores computed by the QoE prediction engine 504 are useful in determining a candidate root cause of the problem. For instance, if network metrics 514 such as loss, latency, or jitter are the main drivers of the prediction, it is likely that the problem stems from the network itself. In this case, resolution search engine 506 may refine its search, accordingly. In one embodiment, such scores can take the form of Shapley values.
- A database of resolution strategies that may be prepopulated by domain experts, end users, other knowledgeable parties, or other available online resources, that provide expert data 516 to application experience optimization process 248. In general, this database may include resolution strategies (e.g., turn off VPN, switch to 5G, etc.) which may improve the QoE of the application.

In general, a goal of resolution search engine 506 is to determine which resolution to suggest to the end user, if any. In some circumstances (e.g., when the degradation is due to a factor that the user cannot control at all, such as a global outage of the application provider), resolution search engine 506 may come up empty-handed. In such a case, it may notify the end user that there is currently no resolution possible or, at least, with the current system/network setup of the user. In most situations, however, resolution search engine 506 will suggest strategies and actions to the user that will improve their experience with the online application.

In one embodiment, resolution search engine 506 may use feature importance scores as a sort of "query" to its database, wherein the magnitude and order of the feature importance scores will be a match for only a few possible resolutions. This could be achieved, for instance, using a classifier that takes as input the feature importance scores and assigns scores to each possible resolution. Then, resolution search engine 506 may evaluate the top resolutions for the specific user. For instance, if the top resolution is "switch to a 5G cellular connection," resolution search engine 506 may check whether this is even an option for the user (e.g., whether the user is currently contracted with a 5G cell provider, whether such a provider is even available in the user's location, etc.), and validate whether the expected QoE would indeed represent an improvement, where the action to be implemented.

To this end, resolution search engine 506 may leverage user information 510 and what-if engine 508, which is described in greater detail below. In general, what-if engine 508 may comprise a model that able to evaluate the impact on the application QoE of a resolution strategy, given a user profile and the associated telemetry. For instance, candidate resolutions for an issue whose root cause is a limited uplink bandwidth can be:

- Switching to another service provider, which can be achieved by:
  - Switching to 5G/LTE
  - Switching to a different SSID
  - Switching to a wired connection
- Enabling QoS on the first hop router to preferentially forward the application traffic
- Shutting down other applications that consume traffic on the client device (e.g., backups, large downloads).

Which of the above remediations are applicable to the user depends on details about the local client device and network, the availability of connectivity options, etc. All these details may be available from data ingestion pipelines 502 and user information 510. Note also that such information may be obtained either a-priori or on-depend when a potential resolution exists.

Resolution search engine 506 may then iterate through each candidate resolution, check whether it is applicable based on the user's profile, and check whether it is likely to improve the experience using what-if engine 508. If all of these conditions are satisfied, then resolution search engine 506 may provide the recommended action, or set of actions, for presentation to the user. For instance, assume that QoE prediction engine 504 predicts that the QoE for a particular application is degraded for client device 518. In such a case, resolution search engine 506 may determine the recommendation 520 and provide it to client device 518 (e.g., for presentation by an agent of client device 518). This can be done via a chat bot (e.g., a Webex bot, etc.), a local notification of the operating system, a text message, a pop-up window, or the like. For instance, recommendation 520 may appear similar to the following:

"You seem to be experiencing some issues with SharePoint due to a problem with your service provider. Switching to your 5G connection should fully resolve the issue."

Regardless of the presentation medium, the user of client device 518 may have the ability to opt not to implement the recommended action(s) in recommendation 520 for various reasons, such as any or all of the following, which may be captured as feedback 522 sent back to the recommendation service:

1. They do not believe the QoE of the application to be degraded. This would indicate a problem with the QoE prediction model of QoE prediction engine 504 which, in turn, could be refined using this feedback.
2. The recommendation is not applicable (e.g., they do not have a 5G connection available). This would indicate a problem with the user profile, which could then be fixed, accordingly, or at the very least inspected for potential malfunctioning.
3. They do not understand how to implement recommendation 520. That would indicate that recommendation 520 is too complex, or the quality of the instructions is poor.
4. They simply do not wish to apply recommendation 520. This could indicate that the recommendation is too complex, or the problem not serious enough to warrant the effort.

Even in the instance of the user opting the implement recommendation 520, resolution search engine 506 may still seek feedback 522 sometime after providing recommendation 520. For instance, resolution search engine 506 could ask the user the following:

"Did my recommendation improve your experience with SharePoint?"

Similar to the feedback indicating that recommendation 520 was not implemented, this type of feedback could equally be useful for purposes of updating the user profile, QoE prediction model of QoE prediction engine 504, recommendations of resolution search engine 506, and/or the model of what-if engine 508.

According to various embodiments, what-if engine 508 may be responsible for quantitatively assessing the impact of a recommendation on the QoE of the application in question. Indeed, it is not because remediation is feasible that it may also be effective. Thus, the role of what-if engine 508 is to answer this question as accurately as possible. To this end, what-if engine 508 may rely on the same or a similar prediction model as that of QoE prediction engine 504, which is used to predict the QoE of a given "scenario." More specifically, the role of what-if engine 508 may be to build the feature vector that would be obtained, had given remediation been applied, so that the resulting QoE can then be predicted. For instance, assuming that the recommended action corresponds to shutting down another application that consumes 1.5 Mbps of the downlink bandwidth, what-if engine 508 may construct the "most likely" feature vector given that the action is implemented and pass it to QoE prediction engine 504 for prediction (or its own internal QoE prediction model). If the model predicts an increase in the QoE compared to the current situation, then then the remediation is selected. Otherwise, it is discarded and what-if engine 508 evaluates the next one.

In one embodiment, what-if engine 508 comprises a machine learning model that predicts $F_{after}$, the most likely QoE prediction engine 504 input feature vector after remediation, based on $F_{before}$, the current QoE prediction engine 504 input feature vector, and on features encoding the recommended remediation action.

The remediation can be translated by its direct impact on the general state of the user system (e.g., a decrease of CPU load, increase of available bandwidth, etc.). In this regard, what-if engine 508 may encode a recommendation/remediation with two feature vectors:

- $S_{before}$: categorical and numerical features representing the current general state of the user system (e.g., device type, type of connectivity, memory and CPU usage, bandwidth, etc.); and
- $S_{after}$: the same features as $S_{before}$, but computed for after the change. Here, $S_{after}$ is computed by updating $S_{before}$ based on the nature of the remediation, e.g., if the remediation consists in closing an application, $S_{after}$ is obtained by appropriately decreasing the values of "CPU load" and "memory usage" features and increasing the value of the "available bandwidth" feature.

Note that a change in the general state of the client's system can also have an impact on the network and/or application telemetry, as well (the transition $S_{before} \rightarrow S_{after}$ leads to the transition $F_{before} \rightarrow F_{after}$), which is what what-if engine 508 is trained to predict: the inputs of the model are $S_{before}$, $S_{after}$, and $F_{before}$ and its output is the predicted $F_{after}$. What-if engine 508 may be trained in a supervised fashion on a state transition dataset which is obtained from the datalake by flagging the different historical user events (connectivity change, closing an application, . . . ) and extracting the corresponding $S_{before}$, $S_{after}$, and $F_{before}$ and $F_{after}$. The objective of the model is to minimize a prediction loss (such as a mean squared error) between the predicted vectors $F_{pred}$ and the ground truth vectors $F_{after}$.

In another embodiment, $F_{before}$ and $F_{after}$ are replaced by their projections onto a latent space learned by an auto-encoder (AE). The AE is trained to minimize the reconstruction error on a dataset composed of the feature vectors extracted from the datalake. Predicting encoded features rather than the raw input vector should be easier for the model of what-if engine 508 since the input feature vector can contain a high number of features, which may also be redundant in some cases, while the encodings contain compressed and denoised information, and are of smaller dimension and normalized. Then, the encoding predicted by the what-if model is decoded by the AE to obtain the most-likely input feature vector for the QoE prediction model for the given remediation. It is also possible to train the QoE prediction model to predict the QoE directly from the encoded features, in which case the decoding step is not necessary, in a further embodiment.

In yet another embodiment, both the QoE prediction model and the what-if model are deep neural networks (DNNs). The advantage of this is that the trained QoE prediction model can be called within the loss function of the what-if model to evaluate $Q_{pred}$, the QoE metric associated with the predicted feature vector $F_{pred}$ (e.g., the output of what-if engine 508). What-if engine 508 can then use a loss function to compare $Q_{pred}$ to $Q_{before}$ (the QoE associated with $F_{before}$) and $Q_{after}$ (the QoE metric associated with $F_{after}$) and penalize the predictions of the what-if model that would have led to poor decisions.

For instance, if $Q_{after} < Q_{before}$, but $Q_{pred} > Q_{before}$, then (assuming the QoE prediction model is accurate) the transition $S_{before} \rightarrow S_{after}$ would have degraded the QoE, yet the what-if model thinks otherwise and the prediction would have led to a false positive. On the other hand, if $Q_{after} \rightarrow Q_{before}$ but $Q_{pred} < Q_{before}$, then (again assuming the QoE prediction model is accurate), the transition $S_{before} \rightarrow S_{after}$ would have improved the QoE, yet the what-if model thinks otherwise and the prediction would have led to a false negative.

In yet another embodiment, the what-if model of what-if engine 508 may be biased toward minimizing false positives and false negatives, in addition to minimizing the error between $F_{pred}$ and $F_{after}$. It is also possible for what-if engine 508 to weight the different factors of the loss function, for instance to maximize the precision of the end-to-end remediation recommender (when it recommends a set of one or more remediation actions, it shall never result in a QoE degradation), while allowing it to miss a few 'good' recommendations.

Once trained, the what-if model of what-if engine 508 can be leveraged to estimate the most likely QoE prediction model input feature vector given the current state of the user and the remediation proposed by the resolution search engine 506. This feature vector is then evaluated by the QoE prediction model (e.g., of QoE prediction engine 504) to assess the impact of the remediation.

When no remediation is obtained, resolution search engine 506 may send a message to client device 518, to inform the user of the online application that an issue has been detected, but no remediation can be automatically proposed. In turn, resolution search engine 506 may generate a support ticket with a support team, who may follow up with the user at a later time.

Another potential function of resolution search engine 506 may be used by a network administrator to inform users of past QoE issues for which no remediation has been found because of their current setup, but such resolutions would have led to improving their QoE. For example, if a given issue such as a poor voice/video QoE has been experienced by a large number of users and could be solved by switching to 4G or 5G cellular for specific calls (e.g., calls in high definition, . . . ), the recommendation service could suggest the user to adapt their setup by adding a 4G or 5G cellular connection, or even switch to another service provider with which the user is not currently contracted. The system may record the service provider providing a better QoE for other users in the same region and even suggest adopting another service provider. Another example may be to recommend that the user upgrade to a more powerful system (e.g., a new router, a new client device, etc.), if resolution search engine 506 determines that this could have led to solving the QoE issue experienced by the user.

Figure 6:
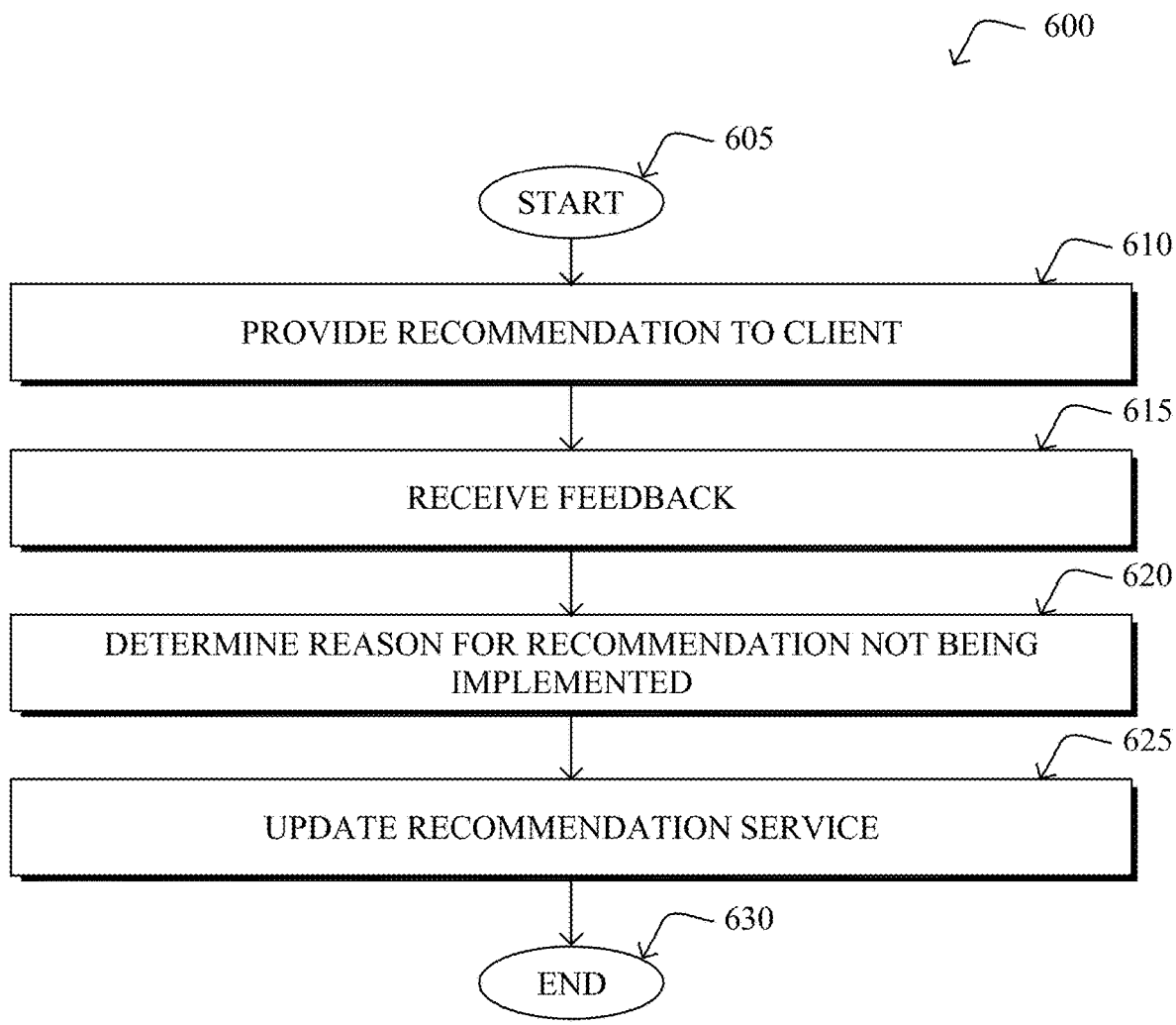
FIG. 6 illustrates an example simplified procedure for providing recommendations to end users to ensure satisfactory application QoE.

FIG. 6 illustrates an example simplified procedure 600 (e.g., a method) for providing recommendations to end users to ensure satisfactory application QoE, in accordance with one or more embodiments described herein. For example, a non-generic, specifically configured device (e.g., device 200), such as controller for a network (e.g., an SDN controller, a cloud-based device, etc.), an edge router, or other device in communication with a network, may perform procedure 600 by executing stored instructions (e.g., application experience optimization process 248). The procedure 600 may start at step 605, and continues to step 610, where, as described in greater detail above, a recommendation service of the device may provide a recommended action to a client of an online application predicted to improve a quality of experience metric for the online application. In some embodiments, the recommended action corresponds to the user switching to a different client or replacing a networking device. In further embodiments, the recommended action corresponds to using a different network connection to connect to the online application, closing one or more other applications on the client, or making a configuration change to a router via which the client sends traffic to the online application. In other embodiments, the recommended action is based on a profile associated with the user of the client that indicates one or more of: their location, one or more uplink options available to the client, or a permission level of the user on the client. In one embodiment, the device may also predict the quality of experience metric for the online application, using a prediction model and based in part on application telemetry obtained from the online application, network telemetry associated with the online application, and client telemetry from the client. In a further embodiment, the recommended action comprises the user contracting with a different service provider (i.e., a service provider with which the user is not currently contracted).

At step 615, as detailed above, the device may receive feedback from the client indicative of the recommended action not being implemented by a user of the client. In some embodiments, the device may prompt, via the client, the user for feedback regarding the recommended action, after providing the recommended action to the client.

At step 620, the device may determine, based on the feedback, a reason for the recommended action not being implemented, as described in greater detail above. In some embodiments, the reason for the recommended action not being implemented corresponds to the user being unwilling to recommended action to be too complex to implement.

At step 625, as detailed above, the device may update the recommendation service based on the reason for the recommended action not being implemented. In some embodiments, the device may do so by updating the profile associated with the user, when the reason for the recommended action not being implemented corresponds to the user being unable to perform the recommended action. In other embodiments, the device may do so by updating the prediction model, when the reason for the recommended action not being implemented corresponds to the user not believing the quality of experience of the online application to be degraded.

Procedure 600 then ends at step 630

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for an end user recommendation service to ensure satisfactory application quality of experience (QoE), it is to be understood that various other adaptations and modifications may be made within the spirit and scope of the embodiments herein. For example, while certain embodiments are described herein with respect to using certain models for purposes of predicting application experience metrics, application QoE, disruptions in a network, etc., the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
providing, by a recommendation service for an online application of a device, a recommended action to a client of the online application predicted to improve a quality of experience metric for the online application;
receiving, at the device, feedback from the client indicative of the recommended action not being implemented by a user of the client;
determining, by the device, and based on the feedback, a reason for the recommended action not being implemented; and
updating, by the device, another recommendation service for a different online application based on the reason for the recommended action not being implemented.

2. The method as in claim 1, further comprising:
prompting, by the device and via the client, the user for the feedback regarding the recommended action, after providing the recommended action to the client.

3. The method as in claim 1, wherein the reason for the recommended action not being implemented corresponds to the user being unwilling to recommended action to be too complex to implement.

4. The method as in claim 1, wherein the recommended action corresponds to the user switching to a different client or replacing a networking device.

5. The method as in claim 1, wherein the recommended action corresponds to using a different network connection to connect to the online application, closing one or more other applications on the client, or making a configuration change to a router via which the client sends traffic to the online application.

6. The method as in claim 1, wherein the recommended action is based on a profile associated with the user of the client that indicates one or more of: their location, one or more uplink options available to the client, or a permission level of the user on the client.

7. The method as in claim 6, wherein updating the recommendation service comprises:
updating the profile associated with the user, when the reason for the recommended action not being implemented corresponds to the user being unable to perform the recommended action.

8. The method as in claim 1, further comprising:
predicting the quality of experience metric for the online application, using a prediction model and based in part on application telemetry obtained from the online application, network telemetry associated with the online application, and client telemetry from the client.

9. The method as in claim 8, wherein updating the recommendation service comprises:
updating the prediction model, when the reason for the recommended action not being implemented corresponds to the user not believing quality of experience of the online application to be degraded.

10. The method as in claim 1, wherein the recommended action comprises the user contracting with a different service provider.

11. An apparatus, comprising:
one or more network interfaces;
a processor coupled to the one or more network interfaces and configured to execute one or more processes; and
a memory configured to store a process that is executable by the processor, the process when executed configured to:
provide, by a recommendation service for an online application, a recommended action to a client of the online application predicted to improve a quality of experience metric for the online application;
receive feedback from the client indicative of the recommended action not being implemented by a user of the client;
determine, based on the feedback, a reason for the recommended action not being implemented; and
update another recommendation service for a different online application based on the reason for the recommended action not being implemented.

12. The apparatus as in claim 11, wherein the process when executed is further configured to:
prompt, via the client, the user for the feedback regarding the recommended action, after providing the recommended action to the client.

13. The apparatus as in claim 11, wherein the reason for the recommended action not being implemented corresponds to the user being unwilling to recommended action to be too complex to implement.

14. The apparatus as in claim 11, wherein the recommended action corresponds to the user switching to a different client or replacing a networking device.

15. The apparatus as in claim 11, wherein the recommended action corresponds to using a different network connection to connect to the online application, closing one or more other applications on the client, or making a configuration change to a router via which the client sends traffic to the online application.

16. The apparatus as in claim 11, wherein the recommended action is based on a profile associated with the user of the client that indicates one or more of: their location, one or more uplink options available to the client, or a permission level of the user on the client.

17. The apparatus as in claim 16, wherein the apparatus updates the recommendation service by:
updating the profile associated with the user, when the reason for the recommended action not being implemented corresponds to the user being unable to perform the recommended action.

18. The apparatus as in claim 11, wherein the process when executed is further configured to:
predict the quality of experience metric for the online application, using a prediction model and based in part on application telemetry obtained from the online application, network telemetry associated with the online application, and client telemetry from the client.

19. The apparatus as in claim 18, wherein the apparatus updates the recommendation service by:
updating the prediction model, when the reason for the recommended action not being implemented corresponds to the user not believing quality of experience of the online application to be degraded.

20. A tangible, non-transitory, computer-readable medium storing program instructions that cause a device to execute a process comprising:
providing, by a recommendation service for an online application of the device, a recommended action to a client of the online application predicted to improve a quality of experience metric for the online application;
receiving, at the device, feedback from the client indicative of the recommended action not being implemented by a user of the client;
determining, by the device, and based on the feedback, a reason for the recommended action not being implemented; and
updating, by the device, another recommendation service for a different online application based on the reason for the recommended action not being implemented.

* * * * *